United States Patent [19]
Takahashi et al.

[11] Patent Number: 6,019,587
[45] Date of Patent: Feb. 1, 2000

[54] STAMPER PLATE ATTACHING/DETACHING DEVICE OF AN INJECTION MOLD FOR FORMING AN OPTICAL DISC SUBSTRATE

[75] Inventors: Mitsuo Takahashi, Matsudo, Japan; Katsuyuki Yasuda, Funabashi, Japan

[73] Assignee: Seikoh Giken Co., Ltd., Matsudo, Japan

[21] Appl. No.: 08/721,026

[22] Filed: Sep. 26, 1996

[30] Foreign Application Priority Data

Nov. 28, 1995 [JP] Japan .................................. 7-331230

[51] Int. Cl.[7] .................................................. B29C 45/17
[52] U.S. Cl. .......................... 425/3; 425/192 R; 425/193; 425/810; 425/DIG. 33
[58] Field of Search .................................. 425/3, 192 R, 425/193, 810, DIG. 33, DIG. 60

[56] References Cited

U.S. PATENT DOCUMENTS

| | | | |
|---|---|---|---|
| 4,737,096 | 4/1988 | Poorten | 425/190 |
| 4,907,956 | 3/1990 | Ezaki et al. | 425/110 |
| 5,135,376 | 8/1992 | Watanabe et al. | 425/110 |
| 5,326,240 | 7/1994 | Kudo et al. | 425/3 |
| 5,612,062 | 3/1997 | Takahashi | 425/3 |

FOREIGN PATENT DOCUMENTS

| | | |
|---|---|---|
| 2-60502 | 12/1990 | Japan . |
| 5-185475A | 7/1993 | Japan . |

*Primary Examiner*—Patrick Ryan
*Assistant Examiner*—Ivrie A. Schwartz
*Attorney, Agent, or Firm*—Spencer & Frank

[57] ABSTRACT

A stamper plate attaching/detaching device of an injection mold for forming an optical disc substrate wherein a stamper plate is supported in a cavity which is formed by a cavity side disc cavity plate, a movable disc cavity plate, and a cavity ring. The stamper plate attaching/detaching device is equipped with a section for holding the outer circumferential rim of the stamper plate by means of the inner circumferential rim of the cavity ring, which inner circumferential rim is larger than the outer diameter of the stamper plate. A plurality of pairs of permanent magnets, which have magnetic poles in parallel with respect to a central line are buried, with phase differences, on the same radial line of the cavity side disc cavity plate and the movable disc cavity plate. The cavity ring rotates between a first angle position and a second angle position in relation to the cavity side disc cavity plate and the movable disc cavity plate.

12 Claims, 3 Drawing Sheets

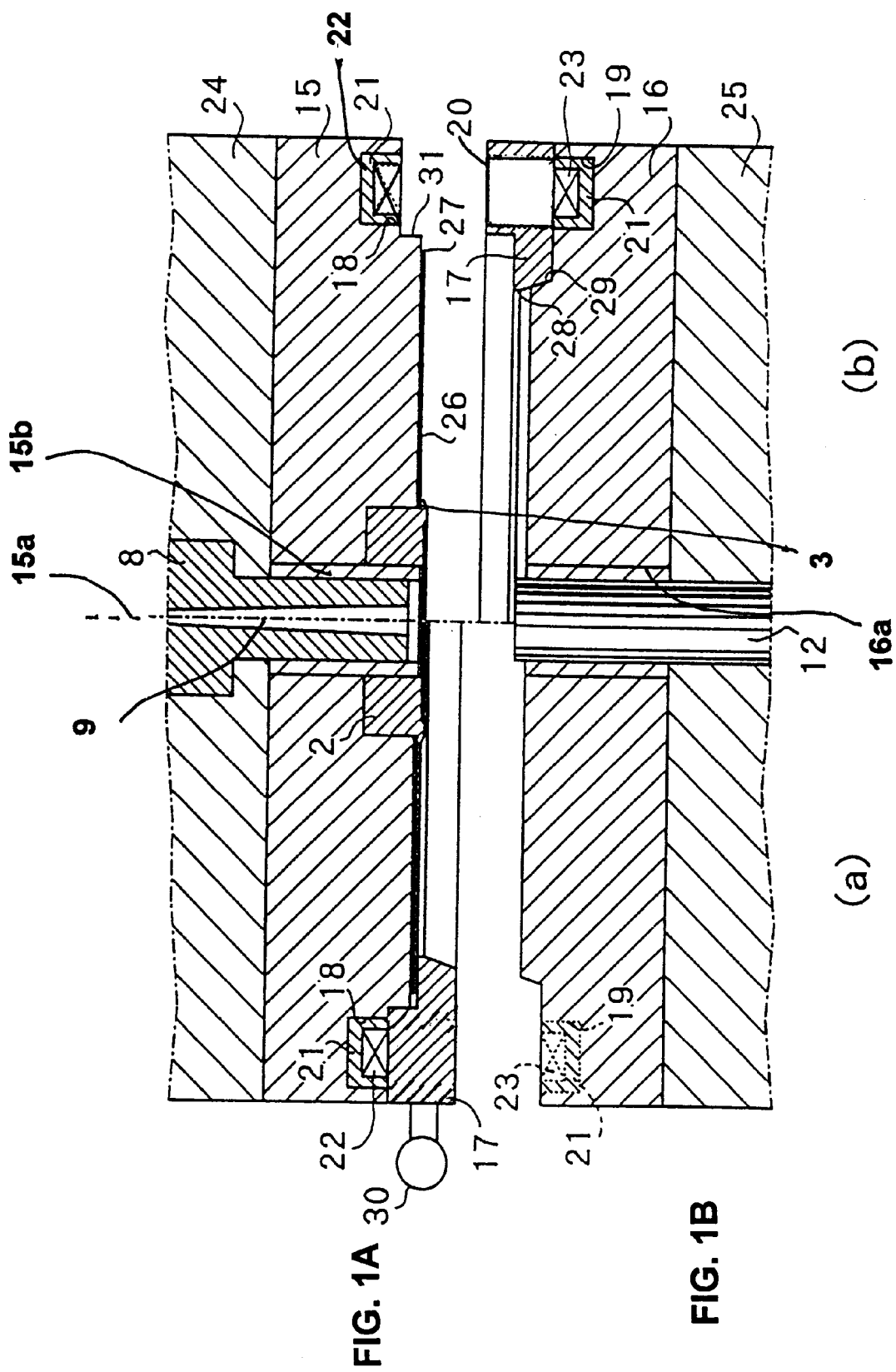

STAMPER PLATE ATTACHING/DETACHING DEVICE OF AN INJECTION MOLD FOR FORMING AN OPTICAL DISC SUBSTRATE

BACKGROUND OF THE INVENTION

1. Field of the Invention

The present invention relates to a stamper plate attaching/detaching device of an injection mold for forming an optical disc substrate for a CD-ROM or the like.

2. Description of the Related Art

FIG. 4 is a cross-sectional view of an essential section of an optical disc substrate injection mold which employs a conventional cavity ring. A stamper plate attaching/detaching device for the optical disc substrate injection mold holds the stamper plate by using the cavity ring and a means for holding the central hole of the stamper plate. A hole 5 for receiving a means 2 for holding the inner circumferential rim of the stamper plate is provided at the center of a cavity side disc cavity plate 4. The cavity side disc cavity plate 4 is fixed to a cavity side base plate 13. A sprue bush 8, which has a resin passage 9 at the center thereof, is provided at the center of the aforesaid members.

To attach a stamper plate 1, the cylindrical body of the stamper plate holding means 2 is inserted in the central hole in the disc-shaped stamper plate 1 to receive the stamper plate 1. A flange 3 of the stamper plate holding means 2 holds the inner circumference rim of the stamper plate 1 against the cavity plate 4. The stamper plate holding means 2 is inserted in the central hole 5 of the cavity side disc cavity plate 4 and is fixed by a known method. Then, a cavity ring 6 is attached to the cavity side disc cavity plate 4 by mounting bolts 7. This procedure is reversed when detaching the stamper plate 1.

A movable disc cavity plate 10 is fixed to a movable base plate 14. A punch 12 for punching a central hole in a disc substrate is inserted in a central hole 11 of the movable disc cavity plate 10.

The conventional device described above is designed to mechanically attach or detach the outer circumferential rim of the stamper plate 1 by installing or removing the cavity ring 6 by installing or removing the mounting bolts 7; it is extensively used because it enables the stamper plate 1 to be securely attached or detached, thus leading to high reliability. The stamper plate 1, however, must be attached or detached with the mold installed in a limited space in a molding machine. This makes it extremely difficult and also dangerous to detach or attach the stamper plate. Hence, there has been a high demand for an improved method of attaching and detaching the stamper plate.

To solve the problem stated above, there has been proposed an injection mold for making optical disc substrates which is equipped with a vacuum suction type stamper plate holder (refer, for example, to Japanese Patent Publication No. 2-60502). In this type of metal mold, the stamper plate can be easily removed from the disc cavity plate by stopping vacuum suction. This metal mold, however, has the following shortcoming: the cavity of the metal mold for injection-molding optical disc substrates is frequently put in a vacuum state by vacuum suction before filling the cavity with melted resin in order to improve the uniformity of the density of the melted resin charged in the cavity. In this case, the rear surface of the stamper plate and the cavity are vacuumized to the same level and the suction force on the rear surface of the stamper plate is not effective. This leads to a danger in that the stamper plate comes off a cylindrical bush due to the vibration of the molding machine operating at high speed or if a shock is applied to the molding machine. Another problem is the need for driving a vacuum pump at all times as long as the stamper plate is mounted, even when the molding operation is interrupted.

There is also a magnetic attraction type metal mold for molding disc substrates as disclosed in Japanese Patent Laid-Open No. 5-185475. This type of metal mold makes use of the fact that the stamper plate is made of nickel featuring permeability; a solenoid coil electromagnet or magnet shaped like a disc is buried in the entire surface of the stamper plate mounting surface of the disc cavity plate on the stamper plate side so as to magnetically attract the stamper plate. The design is advantageous in that the structure of the metal mold is simpler since it does not use a vacuum pump.

This type of metal mold, however, has the following shortcomings. Firstly, the disc cavity plate uses martensite-based stainless steel which is subjected to heat treatment to hardness of $H_R$ C 55 to 60 and also to corrosion-resistance treatment to hardness of $H_V$ 1800 or more in order to protect the surface of the disc cavity plate from scratches and corrosion. In addition, the roughness of the surface must be finished to 10 nm or less. Therefore, it is technically extremely difficult to satisfy the above requirements in embedding a soft magnet material in the surface of the disc cavity plate.

Secondly, the heat controlling techniques including that for maintaining a uniform cooling rate for the disc cavity plate, are as important as the aforesaid selection of the material in ensuring the quality of the disc substrates. It is extremely difficult to assure satisfactory molding functions in the presence of the magnet between the cooling water channel provided at the back surface of the disc cavity plate and the surface of the disc cavity plate.

SUMMARY OF THE INVENTION

Accordingly, it is an object of the present invention to provide a stamper plate attaching/detaching device of an injection mold for an optical disc substrate, which device features a simple construction and which permits easy installation and removal of the stamper plate without impairing the basic functions of a molding machine.

To this end, according to one aspect of the present invention, there is provided a stamper plate attaching/detaching device of an injection mold for forming an optical disc substrate for supporting the stamper plate in a cavity which is formed by a cavity side disc cavity plate, a movable disc cavity plate, and a cavity ring; the stamper plate attaching/detaching device being equipped with:

a section for holding the outer circumferential rim of the stamper plate by means of the inner circumferential rim of the cavity ring, which inner circumferential rim is made larger than the outer diameter of the stamper plate;

a plurality of pairs of permanent magnets which have magnetic poles oriented in parallel to the central line and which are buried, with phase differences, along the same radial line of the cavity side disc cavity plate and the movable disc cavity plate;

rotating means for giving the cavity ring a relative rotation between a first angle position and a second angle position in relation to the cavity side disc cavity plate and the movable disc cavity plate; and an attractive force generating structure designed to cause an attractive force to be generated between the permanent magnets of the cavity side disc cavity plate and the cavity ring but cause no attractive force to be generated between the permanent magnets of the movable disc cavity plate and the cavity ring when the cavity ring is in the first angle position; and to cause no attractive force to be generated between the permanent magnets of the cavity side disc cavity plate and the cavity ring but cause the attractive force to be generated between the permanent magnets of the movable disc cavity plate and the cavity ring when the cavity ring is in the second angle position.

In a preferred form, the stamper plate attaching/detaching device further comprises a stamper plate central hole holding means which holds the central hole rim of the stamper plate, which is pressed by the cavity ring against either disc cavity, against the disc cavity.

In another preferred form, the cavity ring is composed of a ferromagnetic material; it is provided with a hole which prevents the attractive force from being generated when it confronts any pair of the permanent magnets.

In a further preferred form, the means for rotating the cavity ring is a rotating handle which is manually operated.

In yet another preferred form, the magnet material for the permanent magnets is of a neodymium (Ne—Fe—B) type, a samarium cobalt (Sm—Co) type, or an alnico (Al—Ni—Co) type.

According to another aspect of the present invention, there is provided a stamper plate attaching/detaching device of the injection mold for the optical disc substrate for supporting the stamper plate in a cavity which is formed by a cavity side disc cavity plate, a movable disc cavity plate, and a cavity ring; the stamper plate attaching/detaching device being equipped with:

a section for holding the outer circumferential rim of the stamper plate by means of the inner circumferential rim of the cavity ring, which inner circumferential rim is made larger than the outer diameter of the stamper plate;

a plurality of pairs of permanent magnets which have magnetic poles oriented in parallel to the central line and which are buried along the same radial line of the cavity ring; and rotating means for giving the cavity ring a relative rotation between a first angle position and a second angle position in relation to the cavity side disc cavity plate and the movable disc cavity plate;

wherein the cavity side disc cavity plate and the movable disc cavity plate are provided with a structure designed to cause an attractive force to be generated between the cavity side disc cavity plate and the permanent magnets but to cause no attractive force to be produced between the movable disc cavity plate and the permanent magnets when the cavity ring is in the first angle position; and to cause no attractive force to be generated between the cavity side disc cavity plate and the permanent magnets but to cause the attractive force to be generated between the movable disc cavity plate and the permanent magnets when the cavity ring is in the second angle position.

In a preferred form, the stamper plate attaching/detaching device further includes a stamper plate central hole rim holding means which holds the central hole rim of the stamper plate, which is pressed by the cavity ring against either disc cavity, against the disc cavity.

In another preferred form, the stamper plate attaching/detaching device further includes a ferromagnetic section which generates an attractive force when it confronts the permanent magnets of the cavity ring of the cavity side disc cavity plate and the movable disc cavity plate and a hole or a nonmagnetic section which prevents the attractive force from being generated when the cavity side disc cavity plate and the movable disc cavity plate confront the permanent magnet.

In a further preferred form, the means for rotating the cavity ring is a rotating handle which is manually operated.

In yet another preferred form, the magnet material for the permanent magnets is of the neodymium (Ne—Fe—B) type, the samarium cobalt (Sm—Co) type, or the alnico (Al—Ni—Co) type.

BRIEF DESCRIPTION OF THE DRAWINGS

FIGS. 1A and 1B are cross-sectional views of an injection mold for forming an optical disc substrate, which injection mold makes use of a first embodiment of a stamper plate attaching/detaching device of an injection mold for forming an optical disc substrate in accordance with the present invention;

DESCRIPTION OF THE PREFERRED EMBODIMENTS

Figure 2A:
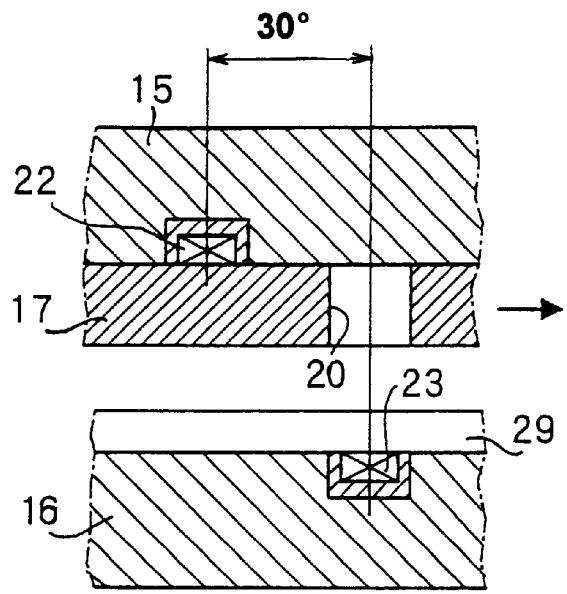
FIGS. 2A and 2B are explanatory views showing the operation of the stamper plate attaching/detaching device of the injection mold for forming the optical disc substrate shown in FIGS. 1A and 1B.

The present invention will now be described in more detail with reference primarily to the accompanying drawings. FIGS. 1A and 1B cross-sectional views of an essential part of a mold which employs the stamper plate attaching/detaching device of an injection mold for forming an optical disc substrate in accordance with the present invention.

Shown on the left side of the drawing is a state wherein a cavity ring 17 has been installed on a fixed cavity side disc cavity plate 15 and a stamper plate 26 has been attached thereto.

Shown on the right side of the drawing is a state wherein the cavity ring 17 has been attached to a movable disc cavity plate 16 and the mold is open for the stamper plate 26 to be attached or detached.

A cylindrical stamper plate holding means 2 has a body which is inserted in a central aperture in the stamper plate 26 and a flange 3 which is larger than a central hole in the stamper plate 26. The cavity side disc cavity plate 15, which has a longitudinal axis 15a and a central hole 15b, is fixed to a cavity side base plate 24. A sprue bush 8 is provided at the center of the aforesaid components. Resin is injected into the cavity through an injection hole 9 for melted resin at the center of the sprue bush 8. The movable disc cavity plate 16, having a central hole 16a coaxial with the longitudinal axis 15a, is provided on a movable base plate 25 and is movable in the direction of the longitudinal axis 15a, punch 12 for punching a hole at the center of an optical disc substrate is inserted in the central hole 16a of the movable disc cavity plate 16 fixed to the movable side base plate 25.

Figure 2B:
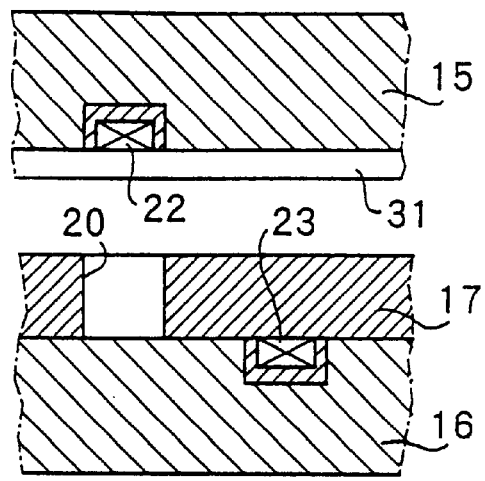

A cavity ring 17 forms, in cooperation with the cavity side disc cavity plate 15 and the movable disc cavity plate 16, a cavity hollow for injection molding when the mold is clamped. The cavity ring 17 also serves to press the outer circumferential rim of the stamper plate 26 against the cavity side disc cavity plate 15. The cavity ring 17 is provided with a handle 30 for rotating the cavity ring 17 between a first angle position and a second angle position about the longitudinal axis 15a in relation to the cavity side disc cavity plate 15 and the movable disc cavity plate 16. The cavity ring 17 has an inside diameter 28 which is smaller than the outside diameter 27 of the stamper plate 26; it is rotatably fitted onto an outer circumferential stepped section 29 of the movable disc cavity plate 16. FIGS. 2A and 2B illustrate the relationship among holes provided in the cavity ring 17, the cavity side disc cavity plate 15, the movable disc cavity plate 16, and permanent magnets provided on the cavity plates 15 and 16. More specifically, FIG. 2A is a development of a section of a cylindrical plane looking toward FIG. 1 from the left side of the sheet, and FIG. 2B is a development of a section of a cylindrical plane looking toward FIG. 1 from the right side of the sheet. The angular positional relationship given in FIG. 2A corresponds to the state shown on the left side of FIGS. 1A and 1B; the angular positional relationship given in FIG. 2B corresponds to the state shown on the right side of FIGS. 1A and 1B.

Six blind holes 18 are provided along the same radial line at equal angles from the outer circumferential rim of the cavity side disc cavity plate 15, i.e. the holes 18 are equidistantly spaced along a first circle having a given diameter, and six blind holes 19 are equidistantly spaced along a second circle of the same diameter as the first circle adjacent the outer circumferential rim of the movable disc cavity plate 16. The blind holes 18 and 19 are located in facing surfaces of the cavity plates 15 and 16, the angles subtended by radial lines extending from the axis 15a to adjacent holes 18 and 19 being 30 degrees. Likewise, the cavity ring 17 is provided with six through holes 20 equidistantly spaced along a third circle of the same diameter as the first and second circles.

The disc cavity plates 15 and 16 respectively have six neodymium (Ne—Fe—B) rod-shaped permanent magnets 22 and 23 inserted in bushes 21 made of a nonmagnetic material such as ferrite-based stainless steel positioned within the six blind holes 18 and 19. Shown at the left in FIGS. 1A and 1B is a state wherein the cavity ring 17 has been mounted on the cavity side disc cavity plate 15; shown at right in the same drawing is a state wherein the cavity ring 17 has been moved to the movable disc cavity plate 16.

An optical disc substrate is injection-molded while the outer circumferential rim of the stamper plate 26 is being pressed by the cavity ring 17 so that it is brought in close contact with the surface of the cavity side disc cavity plate 15. For this reason, the cavity ring 17 must be mounted and fixed onto the cavity side disc cavity plate 15. The stamper plate 26 cannot be removed with the cavity ring 17 mounted and fixed onto the cavity side disc cavity plate 15. Hence, the cavity ring 17 must be moved onto the movable disc cavity plate 16 first, then the mold is opened to take out the stamper plate 26.

FIG. 2A and FIG. 2B show the positional relationship between the respective permanent magnets and the holes when the cavity ring 17 is attached to the cavity side disc cavity plate 15 and the movable disc cavity plate 16, respectively. As shown in FIG. 2A, when the cavity ring 17 is attached to the cavity side disc cavity plate 15, the rim surface portion except the through hole 20 of the cavity ring 17 overlaps the permanent magnet 22 of the cavity side disc cavity plate 15; the through hole 20 overlaps the permanent magnet 23 of the movable disc cavity plate 16. The through hole 20 is manually moved by the handle 30 of the cavity ring 17 to an angular position where it overlaps the permanent magnet 23 of the movable disc cavity plate 16. The attractive force given by the permanent magnet 22 of the cavity side disc cavity plate 15 causes the cavity ring 17 to be attracted and fixed to an outer circumferential stepped surface 31 of the cavity side disc cavity plate 15. At this time, the position of the permanent magnet 23 of the movable disc cavity plate 16 coincides with the position of the through hole of the cavity ring 17; therefore, the attractive force is not applied to the cavity ring 17.

Shown in FIG. 2B is the state wherein the cavity ring 17 has been moved from the cavity side disc cavity plate 15 to the movable disc cavity plate 16. More specifically, with the mold incompletely clamped with a gap of 0.5 mm or less still left, the cavity ring 17 is rotated manually in the opposite direction by the handle 30 so that the rim surface portion of the cavity ring 17 except the through hole 20 overlaps the permanent magnet 23 of the movable disc cavity plate 16 and the through hole 20 coincides with the position of the permanent magnet 22 of the cavity side disc cavity plate 15. This causes the cavity ring 17 to be attracted to the movable disc cavity plate 16 by the attractive force given by the permanent magnet 23 of the movable disc cavity plate 16. The attractive force of the permanent magnet 22 of the cavity side disc cavity plate 15 does not work on the surface of the cavity ring 17. The stoppers at both ends of the rotational range of the cavity ring 17, a detent, and the like are provided according to a known method although they are not shown.

Shown in FIG. 2A is the positional relationship established when the cavity ring 17 is in the first angle position. Under the positional relationship, an attractive force is generated between the permanent magnet 22 of the cavity side disc cavity plate 15 and the cavity ring 17, whereas no attractive force is generated between the permanent magnet 23 of the movable disc cavity plate 16 and the cavity ring 17. Shown in FIG. 2B is the positional relationship established when the cavity ring 17 is in the second angle position. Under the positional relationship, no attractive force is generated between the permanent magnet 22 of the cavity side disc cavity plate 15 and the cavity ring 17, whereas the attractive force is generated between the permanent magnet 23 of the movable disc cavity plate 16 and the cavity ring 17.

Figure 3:
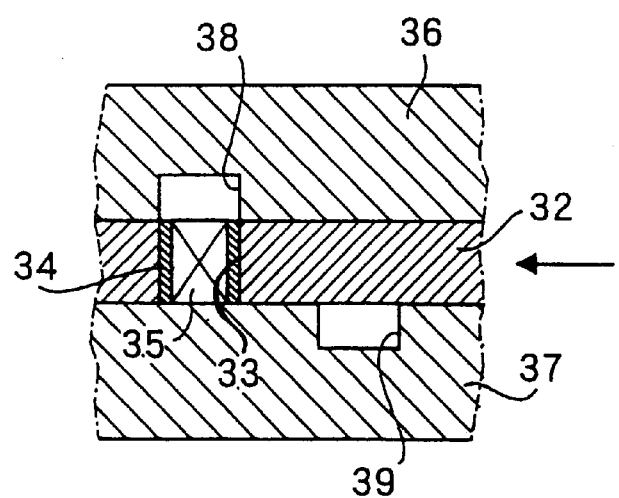
FIG. 3 is an explanatory view of the operation of a second embodiment of the stamper plate attaching/detaching device of the injection mold for forming an optical disc substrate in accordance with the present invention.
Figure 4:
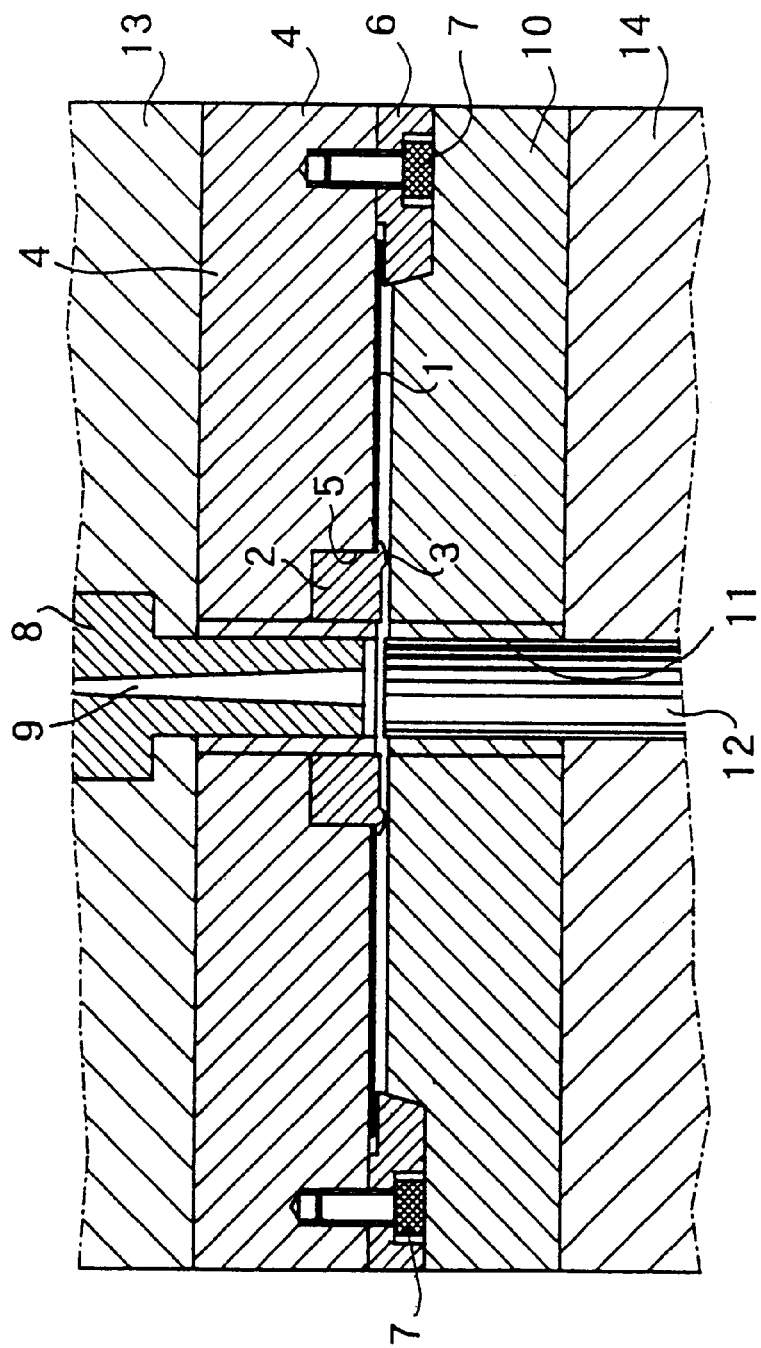
FIG. 4 is a cross-sectional view of the structure of an injection mold for forming an optical disc substrate which employs a conventional cavity ring.

FIG. 3 is an explanatory diagram for illustrating the structure and operation of a second embodiment of the stamper plate attaching/detaching device of the injection mold for forming an optical disc substrate in accordance with the present invention. The basic structure of the mold to which the second embodiment is to be applied is identical to that described with reference to FIGS. 1A and 1B and FIG. 4. Six permanent magnets 35, which have magnetic poles oriented in the vertical direction, are buried in through holes 33 in a cavity ring 32 via bushes 34 composed of a nonmagnetic material including a feeble or diamagnetic material. The cavity side disc cavity plate 36 and the movable disc cavity plate 37 are respectively provided with blind holes 38 and 39, the angles subtended by radial lines extending from the axis 15a to adjacent holes 38 and 39 being 30 degrees. The procedure for attaching and detaching the stamper plate of the injection mold for the optical disc substrate is the same as that for the first embodiment.

FIG. 3 shows a state wherein the cavity ring 32 is in the second angular position in relation to the cavity side disc cavity plate 36 and the movable disc cavity plate 37. In this state, no attractive force is generated between the cavity side disc cavity plate 36 and the permanent magnet 35, whereas the attractive force is generated between the movable disc cavity plate 37 and the permanent magnet 35. When the cavity ring 32 is in the first angular position (not shown) in relation to the cavity side disc cavity plate 36 and the movable disc cavity plate 37, the attractive force is generated between the cavity side disc cavity plate 36 and the permanent magnet 35, whereas no attractive force is generated between the movable disc cavity plate 37 and the permanent magnet 35.

The injection molds for forming optical disc substrates which employ the embodiments described above have the following advantages.

Firstly, the stamper plate does not come off as in the case of a vacuum suction type device. Secondly, according to the present invention, there is no need to change the material of the disc cavity plates or to add a change to the conventional heat transfer structure since the magnets are not buried in the surfaces of the disc cavity plates which correspond to the signal bit area of the stamper plate. This makes it possible to use the basic structure of a field-proven, reliable mold for the disc substrate. Thirdly, since no mounting bolts are involved for attaching the cavity ring to the disc cavity plates, the stamper plate can be attached or detached quickly, securely and safely with the mold installed in the injection molding machine.

The present invention can be embodied in other specific forms without departing from the spirit or essential characteristics thereof. For instance, the permanent magnets may be buried in both cavity plate and cavity ring so that the attractive force is generated when the surfaces of opposite poles face each other and a repulsive force is generated when the surfaces of the same poles face each other.

What is claimed is:

1. A stamper plate attaching/detaching device of an injection mold for forming an optical disc substrate, said device having a longitudinal axis, comprising:

a fixed disc cavity plate having a plurality of first magnets buried in a surface thereof, said first magnets being equally spaced along a first circle having a center on said longitudinal axis and a given diameter;

a movable disc cavity plate having a plurality of second magnets buried in a surface thereof, said second magnets being equally spaced along a second circle having a center on said longitudinal axis and said given diameter, said plurality of second magnets being angularly displaced about said longitudinal axis with respect to said plurality of first magnets;

a cavity ring interposed between said fixed and movable cavity plates, said cavity ring, fixed cavity plate and movable cavity plate defining a cavity wherein a stamper plate is supported;

means for rotating said cavity ring about said longitudinal axis between a first angular position and a second angular position with respect to said fixed and movable cavity plates; and an attractive force generating means, said means generating when said cavity ring is in said first angular position an attractive force between said plurality of first magnets and said cavity ring and not generating an attractive force between said plurality of second magnets and said cavity ring; and when said cavity ring is in said second angular position not generating an attractive force between said plurality of first magnets and said cavity ring and generating an attractive force between said plurality of second magnets and said cavity ring.

2. A stamper plate attaching/detaching device of an injection mold for forming an optical disc substrate according to claim 1, further comprising a stamper plate holding means positioned within said fixed disc cavity plate along said longitudinal axis, said holding means supporting an inner circumferential edge of a hole in said stamper plate.

3. A stamper plate attaching/detaching device of an injection mold for forming an optical disc substrate according to claim 1 wherein said cavity ring is composed of a ferromagnetic material, and wherein said cavity ring has a plurality of holes therein spaced along a third circle having a center on said longitudinal axis and said given diameter, said cavity ring not being attracted to said movable disc cavity plate when the holes in said cavity plate are in alignment with said second magnets and not being attracted to said fixed disc cavity plate when the holes in said cavity plate are in alignment with said first magnets.

4. A stamper plate attaching/detaching device of an injection mold for forming an optical disc substrate according to claim 1 wherein said means for rotating said cavity ring is a manually operated handle.

5. A stamper plate attaching/detaching device of an injection mold for forming an optical disc substrate according to claim 1 wherein said magnets are permanent magnets, and the material of which said magnets are composed is selected from the group consisting of neodymium (Ne—Fe—B), samarium cobalt (Sm—Co) and alnico (Al—Ni—Co).

6. A stamper plate attaching/detaching device of an injection mold for forming an optical disc substrate, said device having a longitudinal axis, comprising:

a fixed disc cavity plate having a plurality of first holes in a surface thereof, said first holes being equally spaced along a first circle having a center on said longitudinal axis and a given diameter;

a movable disc cavity plate having a plurality of second holes in a surface thereof, said second holes being equally spaced along a second circle having a center on said longitudinal axis and said given diameter, said plurality of second holes being angularly displaced about said longitudinal axis with respect to said plurality of first holes;

a cavity ring interposed between said fixed and movable cavity plates, said cavity ring, fixed cavity plate and movable cavity plate defining a cavity wherein a stamper plate is supported, said cavity ring having a plurality of magnets therein spaced along a third circle having a center on said longitudinal axis and said given diameter;

means for rotating said cavity ring about said longitudinal axis between a first angular position and a second angular position with respect to said fixed and movable cavity plates; and an attractive force generating means, said means generating when said cavity ring is in said first angular position an attractive force between said plurality of magnets and said fixed disc cavity plate and not generating an attractive force between said plurality of magnets and said movable disc cavity plate; and when said cavity ring is in said second angular position not generating an attractive force between said plurality of magnets and said fixed disc cavity plate and generating an attractive force between said plurality of magnets and said movable disc cavity plate.

7. A stamper plate attaching/detaching device of an injection mold for forming an optical disc substrate according to claim 6, further comprising a stamper plate holding means positioned within said fixed disc cavity plate along said longitudinal axis, said holding means supporting an inner circumferential edge of a hole in said stamper plate.

8. A stamper plate attaching/detaching device of an injection mold for forming an optical disc substrate according to claim 6 wherein said fixed and movable cavity plates are composed of a ferromagnetic material, and wherein said cavity ring is not attracted to said movable disc cavity plate when the magnets in said cavity plate are in alignment with said plurality of second holes and not attracted to said fixed disc cavity plate when the magnets in said cavity plate are in alignment with said plurality of first holes.

9. A stamper plate attaching/detaching device of an injection mold for forming an optical disc substrate according to claim 6 wherein said means for rotating said cavity ring is a manually operated handle.

10. A stamper plate attaching/detaching device of an injection mold for forming an optical disc substrate according to claim 6 wherein said magnets are permanent magnets, and the material of which said magnets are composed is selected from the group consisting of neodymium (Ne—Fe—B), samarium cobalt (Sm—Co) and alnico (Al—Ni—Co).

11. A stamper plate attaching/detaching device of an injection mold for forming an optical disc substrate, said device having a longitudinal axis, comprising:

a fixed disc cavity plate having a plurality of first magnets buried in a surface thereof, said first magnets being equally spaced along a first circle having a center on said longitudinal axis and a given diameter;

a movable disc cavity plate having a plurality of second magnets buried in a surface thereof, said second magnets being equally spaced along a second circle having a center on said longitudinal axis and said given diameter, said plurality of second magnets being angularly displaced about said longitudinal axis with respect to said plurality of first magnets;

a cavity ring interposed between said fixed and movable cavity plates, said cavity ring, fixed cavity plate and movable cavity plate defining a cavity wherein a stamper plate is supported, said cavity ring having a plurality of holes therein spaced along a third circle having a center on said longitudinal axis and said given diameter, and means for rotating said cavity ring about said longitudinal axis between a first angular position and a second angular position with respect to said fixed and movable cavity plates, the holes in said cavity ring not being in alignment with said plurality of first magnets and in alignment with said plurality of second magnets when said cavity ring is in said first angular position, whereby said cavity ring is attracted to said fixed disc cavity plate; and the holes in said cavity ring not being in alignment with said plurality of second magnets and in alignment with said plurality of first magnets when said cavity ring is in said second angular position, whereby said cavity ring is attracted to said movable disc cavity plate.

12. A stamper plate attaching/detaching device of an injection mold for forming an optical disc substrate, said device having a longitudinal axis, comprising:

a fixed disc cavity plate having a plurality of first holes in a surface thereof, said first holes being equally spaced along a first circle having a center on said longitudinal axis and a given diameter;

a movable disc cavity plate having a plurality of second holes in a surface thereof, said second holes being equally spaced along a second circle having a center on said longitudinal axis and said given diameter, said plurality of second holes being angularly displaced about said longitudinal axis with respect to said plurality of first holes;

a cavity ring interposed between said fixed and movable cavity plates, said cavity ring, fixed cavity plate and movable cavity plate defining a cavity wherein a stamper plate is supported, said cavity ring having a plurality of magnets therein spaced along a third circle having a center on said longitudinal axis and said given diameter; and means for rotating said cavity ring about said longitudinal axis between a first angular position and a second angular position with respect to said fixed and movable cavity plates, the magnets in said cavity ring not being in alignment with said plurality of first holes and in alignment with said plurality of second holes when said cavity ring is in said first angular position, whereby said cavity ring is attracted to said fixed disc cavity plate; and the magnets in said cavity ring not being in alignment with said plurality of second holes and in alignment with said plurality of first holes when said cavity ring is in said second angular position, whereby said cavity ring is attracted to said movable disc cavity plate.

* * * * *